United States Patent [19]
Starz

[11] 3,990,735
[45] Nov. 9, 1976

[54] NEWSPAPER DELIVERY AID
[76] Inventor: Walter A. Starz, 4142 Willowbrook Drive, Liverpool, N.Y. 13088
[22] Filed: May 21, 1975
[21] Appl. No.: 579,541

[52] U.S. Cl. .............................. 294/19 R; 294/1 R; 294/50
[51] Int. Cl.² ...................... B25J 1/04; B65D 91/00
[58] Field of Search ............... 294/1 R, 19 R, 19 A, 294/22, 26.5, 34, 50, 50.5–50.9, 86 R, 103 R; 56/328 R, 332, 337; 81/3.8; 220/19; 224/45 W; 232/1 R, 1 C, 43.3; 425/286

[56] References Cited
UNITED STATES PATENTS

| | | | |
|---|---|---|---|
| 335,390 | 2/1886 | Silbermann et al. | 294/50 X |
| 1,092,818 | 4/1914 | Bittner | 294/50.7 X |
| 1,896,083 | 2/1933 | Harris | 425/286 |
| 2,136,658 | 11/1938 | Westberg et al. | 220/19 X |
| 2,618,500 | 11/1952 | Peach | 294/50.7 |
| 2,712,466 | 7/1955 | Light | 294/50.5 |
| 3,210,112 | 10/1965 | Glynn | 294/50.7 |
| 3,444,938 | 5/1969 | Ballmann | 294/50.7 X |

FOREIGN PATENTS OR APPLICATIONS

| | | | |
|---|---|---|---|
| 1,154,756 | 4/1958 | France | 294/19 A |

Primary Examiner—Johnny D. Cherry
Attorney, Agent, or Firm—Robb & Robb

[57] ABSTRACT

A device for facilitating the delivery of newspapers by motor vehicle to individual residential customers on what is commonly referred to as a motor delivery route. The device generally comprises a tubular holder to receive and embrace one end portion of a rolled or folded newspaper, said holder having a rigid handle extended rearwardly therefrom to enable the holder to be maneuvered from within the delivery vehicle into proximity to the customer's roadside or curbside receiver or receptacle, such as a newspaper tube or mailbox, without requiring the delivery person to leave the vehicle when the roadside receiver or receptacle is obstructed by a snowdrift or by a snowbank that has been plowed to the side of the roadway, or by a pile of construction material or refuse awaiting pickup, or other obstructions which prevent the delivery vehicle from approaching the receiver within normal arm's reach. Ejection of the newspaper from the holder is achieved by thrust means movably mounted within the holder and operable from the handle to thrust the newspaper from the holder into the delivery receiver when the holder is extended by the handle into suitably close proximity to and alignment with the receiver.

3 Claims, 9 Drawing Figures

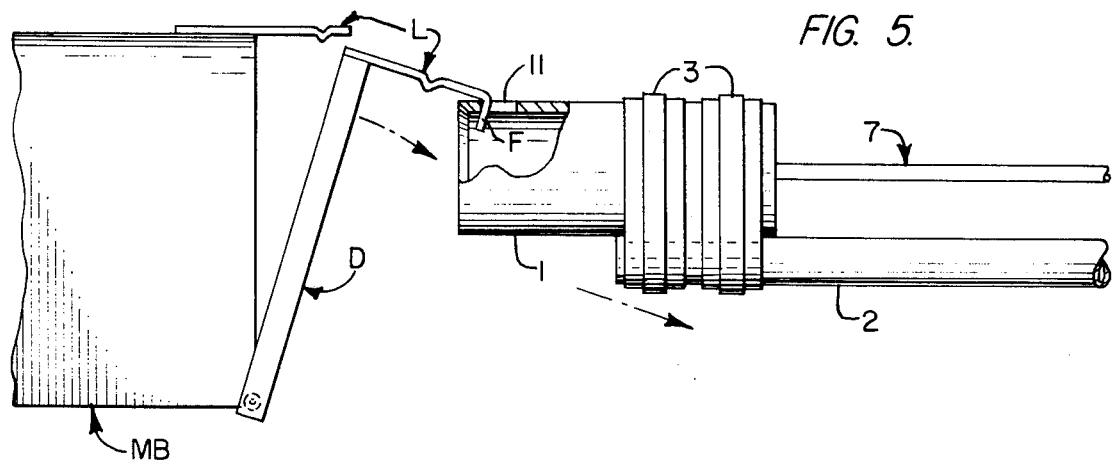
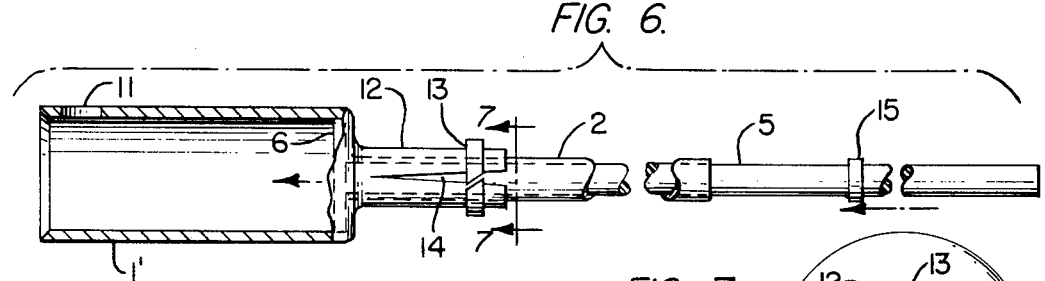
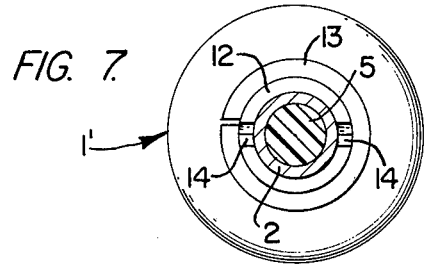
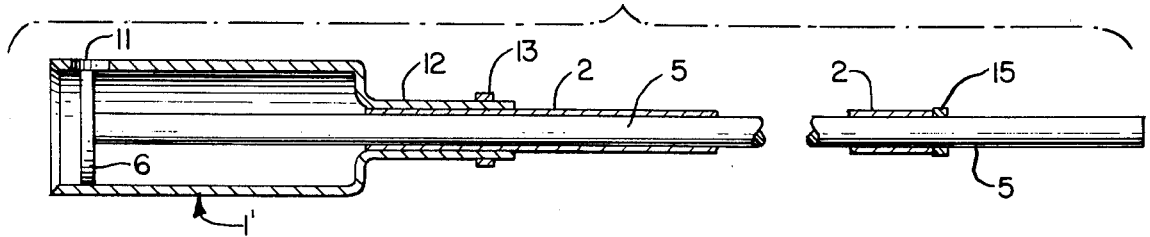
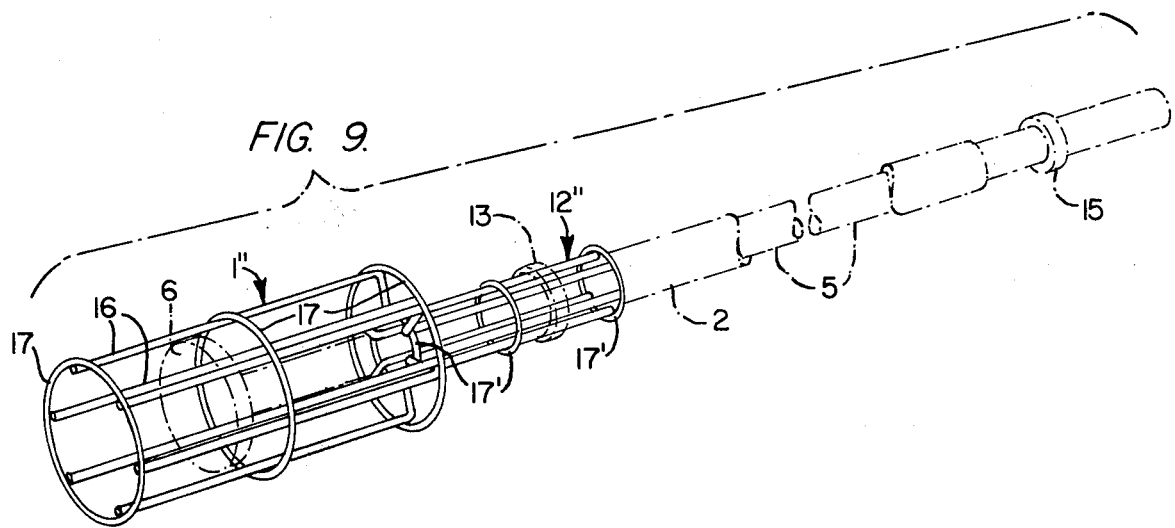

NEWSPAPER DELIVERY AID

The present invention relates to a device for facilitating the delivery of newspapers by motor vehicle to individual residential customers on what is commonly referred to as a motor delivery route on which delivery receivers or receptacles, such as a newspaper tube or mailboxes in the absence of delivery tubes, are located at the roadside or curbside to receive the newspapers as they are delivered along the route.

In some regions where snow is prevalent or where construction materials may be deposited along the roadside, or where refuse is sometimes deposited for pickup, the delivery receiver is often obstructed so that the delivery vehicle cannot be driven close enough to the receiver to enable the delivery person in the vehicle to place the newspaper in the roadside receiver without getting out of the vehicle. In such cases, the person making the delivery must stop the vehicle, apply the parking brake, open the door, get out, and then overcome the obstacle, which usually means climbing a snowbank or snowdrift or other obstacle. This not only takes considerable time and physical energy, but is often attended by great physical discomfort caused by snow or rain, so that by the time the delivery person reaches the end of his route, he is often quite wet and thoroughly exhausted.

My device largely eliminates these physical discomforts and saves considerable time and effort by extending the "reach" of the delivery person so that for the most part, the newspapers can usually be delivered to the roadside receivers without requiring him to leave the delivery vehicle.

In achieving these objectives, the newspaper is rolled or folded and then inserted into the open end of a tubular holder which is of such size and length as to embrace one end portion of the newspaper to an extent that is sufficient to support the newspaper preferably with its opposite end portion extending beyond the forward end of the holder, said holder having a rigid elongated handle extended therefrom at its rearward end for enabling the holder to be extended and manipulated into proximity to and alignment with the receiver to receive the newspaper when ejected from the holder by suitable thrust means disposed within the holder behind the newspaper and operable from the handle, all while the delivery person is still within the delivery vehicle.

A further object of my invention is to provide a device of the aforementioned character which is relatively simple and inexpensive in construction, as well as light in weight, easy to handle and very effective in its use in facilitating the rapid delivery of newspapers along a motor route with a minimum of effort when the roadside delivery receivers are obstructed and cannot be closely approached by the delivery vehicle.

Other and further objects and advantages of the invention will be hereinafter described or will become apparent from the accompanying drawings, and the novel features thereof defined in the appended claims.

In the drawings:

FIG. 5 is a fragmentary view in side elevation, with a portion of the holder broken away and shown in cross-section to better illustrate the manner of use of the delivery aid in opening the door of a conventional rural type roadside mailbox preparatory to delivering a newspaper into the mailbox;

FIG. 6 shows a modified form of my delivery aid wherein the newspaper holder is provided with an axially extended split socket at one end thereof and into which the handle is seated and firmly anchored to the holder;

FIG. 7 is a transverse sectional view as taken on the line 7—7 of FIG. 6;

Figure 1:
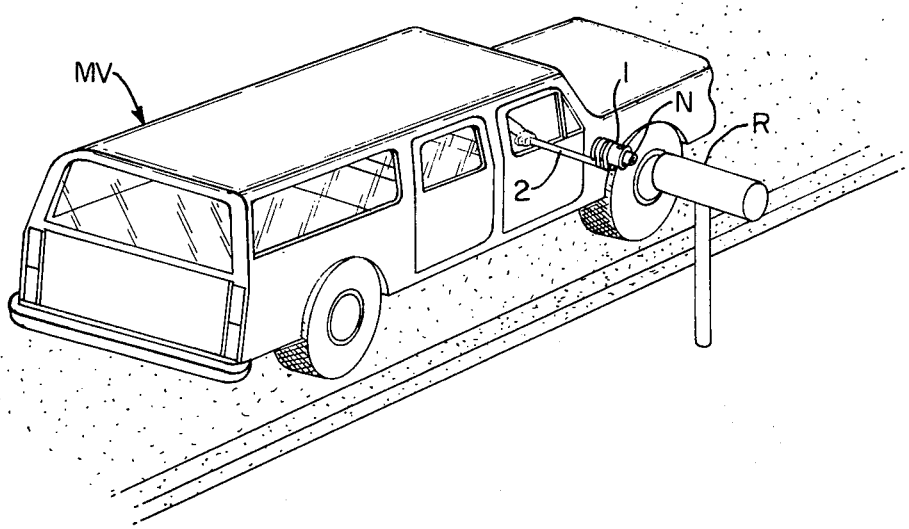
FIG. 1 is a perspective view showing the manner of using one form of my newspaper delivery aid in delivering a newspaper to a conventional roadside newspaper receiver tube located along a motor route, with the aid being extended and manipulated from one side of the motor vehicle while the delivery person remains within the vehicle.
Figure 2:
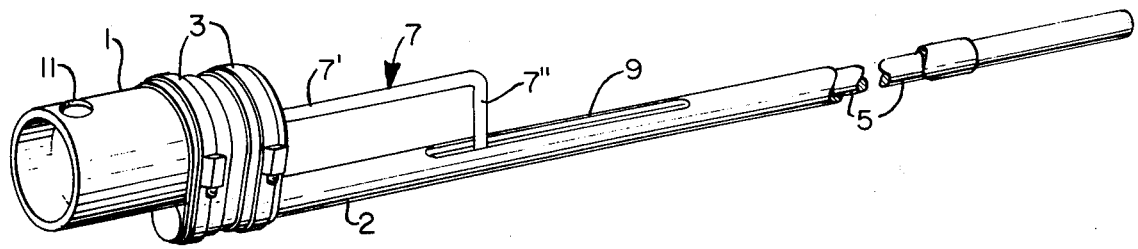
FIG. 2 is a perspective view of the aid per se, as shown on a larger scale than in FIG. 1.

FIG. 8 is longitudinal cross-sectional view of the device of FIG. 6, but with the thrust means shown in a position at the limit of its newspaper ejecting motion after ejecting the newspaper from the holder; and FIG. 9 is a perspective view of a further modified form of the delivery aid in which the newspaper holder and its handle receiving socket are of open-cage form, but the device otherwise generally corresponding to the form depicted in FIGS. 6 and 8, but the thrust means and the handle being shown in broken lines.

Like reference characters designate corresponding parts in the various figures of the drawings.

Figure 3:
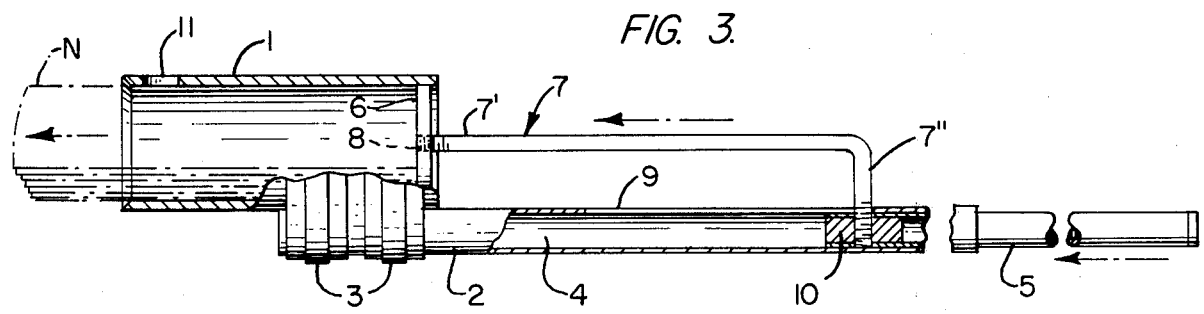
FIG. 3 is a view in side elevation of the delivery aid of FIGS. 1 and 2, with portions of the newspaper holder tube and its handle being broken away and shown in longitudinal cross-section, the thrust means being in its retracted position as when a newspaper is inserted into the holder preparatory to delivery of the newspaper, and the newspaper being represented in broken lines.
Figure 4:
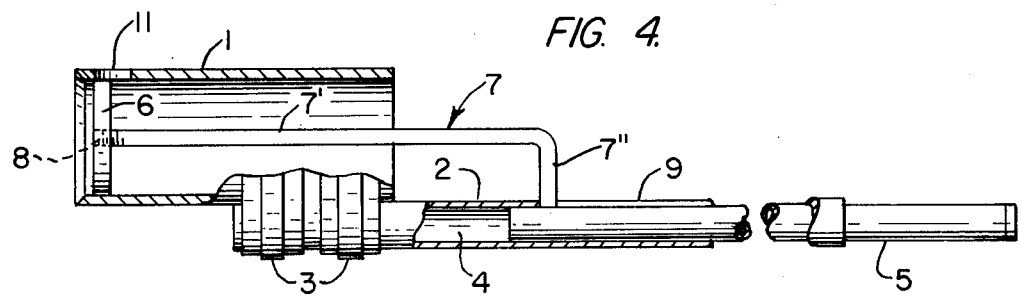
FIG. 4 is a view generally similar to FIG. 3 after ejection and delivery of the newspaper by the thrust means which is shown at the maximum limit of its newspaper ejecting thrust motion.

Referring first to the form of the invention as illustrated in FIGS. 1 to 5, 1 denotes the newspaper holder which has the form of an open-ended tubular body, said body being of such size and length as to be capable of receiving therein and supportingly embracing one end portion of a rolled or folded newspaper and leaving the remainder of the newspaper extended beyond the forward or distal end of the holder, as depicted at N in broken lines in FIG. 3. For all practical purposes, the holder should preferably have an internal diameter of about three inches and a length of about 8 to 9 inches, which I have found to be sufficient to accommodate daily as well as Sunday or special editions of most regular newspapers, but it is to be understood that my invention is not limited to these precise dimensions. Attached to the holder 1 and extended rearwardly therefrom is a rigid handle generally designated 2, said handle preferably being about 4 feet in length for convenient handling, or somewhat longer if desired. In this form of the delivery aid device, the attachment is simply and easily made by tightly taping and then clamping the handle to the outer periphery of the holder 1 over the tape by one or more screw clamps 3, 3 which firmly embrace both the holder and the handle. The handle is either tubular in form or otherwise pole-like and provided with an axially extended bore therethrough, as indicated at 4. Telescopically mounted within the bore is an auxiliary rigid rod or pole 5 which is freely slidable forwardly and rearwardly within the handle 2, but extends somewhat beyond the rear or proximal end of the handle 2.

Slidably mounted within the tubular holder 1 is a piston-like disc or plunger 6 which serves as a thrust means to eject the newspaper N from the holder 1 as each newspaper is delivered to the roadside receiver at each delivery point along the route. The disc 6 is connected to the inner rod or pole 5 which serves as the operator or disc actuator and by means of which the thrust means may be moved forwardly and rearwardly within the holder 1 when the handle 2 is held in one hand and the actuator rod 5 is held in the other hand of the person delivering the newspapers. Interconnection of the thrust disc 6 with the actuator rod 5 is established by a connecting rod 7 of L-shaped form, with one arm 7' of the connector rod being screw-threadedly anchored to the disc as at 8 and being extended coaxially and rearwardly therefrom, and the other arm 7" being extended radially or laterally through an elongated slot 9 provided in the outer handle 2 and having its outer end suitably anchored to the inner rod 5 as at 10. The slot 9 is of such length that movement of the thrust disc 6 is limited by abutting engagement of the respective opposite ends of the slot with the arm 7" of the connecting rod 7, thereby preventing the thrust disc from being inadvertently displaced from either end of the holder 1, but allowing the disc to be retracted to a position near the proximal end of the holder or thrust forward toward a position near the distal end thereof responsive to ejection operation of the actuator rod 5.

In the use of the delivery aid device as illustrated in FIG. 1, the newspaper N is inserted into the holder 1 as shown in FIG. 3, at the same time shoving the thrust disc 6 to its rearward position within the holder as illustrated in this view, or the disc can be initially retracted by means of the actuator rod 5 before inserting the newspaper into the holder. When the delivery motor vehicle MV stops as closely as possible near the customer's roadside receiver R, the driver or other delivery person can extend the loaded delivery aid device through one of the opened side windows of the vehicle and maneuver it by the handle 2 until the holder 1 is substantially aligned with the receiver R. When so aligned, the projecting end position of the newspaper N is inserted into the open end of the receiver and then the newspaper is ejected from the holder 1 by using the outer hand of the delivery person to actuate the thrust disc forwardly by imparting a thrust to the proximal end of the actuator rod 5 which extends rearwardly beyond the handle 2 until the thrust disc 6 reaches the limit of its forward motion near the distal end of the holder. By so using the delivery aid device, it substantially extends the normal reach of the delivery person without the necessity of leaving the vehicle, which is especially helpful when the vehicle cannot approach the receiver closely enough to be reached by normal arm length due to snow-banks or other obstructions.

Instead of having the driver of the motor vehicle MV use the delivery aid device alone, it can also be used by a helper or assistant, in which case, the assistant would preferably be seated in the rear portion of the vehicle and can extend the aid device through one of the rear side-windows of the vehicle, in delivering the newspapers to the roadside receivers.

In FIG. 1, the roadside receiver R is illustrated as being of the type most commonly used along newspaper motor routes, with the receiver being of tubular form having a diameter of three or four inches and being open at both ends. When such receivers are not installed or otherwise available, the newspapers are often delivered to the usual roadside mail box MB which is closed at one end and provided with a hinged door D facing the roadway, said door normally being held closed by a friction type latch L, as shown in FIG. 5. In mail boxes of this type, the door latch L is usually provided with a depending tab or fingerpiece F to facilitate opening of the door by exerting a forward and downward pull thereon. To enable my newspaper delivery aid device to be used with such mail boxes MB, the holder 1 of the device is preferably provided with a hole 11 extended through the wall thereof near the forward end of the holder so that the hole can be engaged with the tab F of the friction latch L to open the door of the mail box MB by manipulation of the delivery aid device as illustrated in FIG. 5. After delivery of the newspaper to the mail box, the hinged door can be closed by lifting and pushing the door closed by engaging the forward end of the holder therewith, as will be obvious.

Referring to the modified form of my invention as illustrated in FIG. 6 to 8 of the drawings, the holder 1' is reduced in size at one end to form a tubular socket 12 extended coaxially therefrom at its rear end and into which the handle 2 of the device is seated and firmly anchored to the holder, as by means of a split spring clamping ring 13, said socket preferably being provided with one or more longitudinally extended slots 14 to allow tight contraction of the socket about the end of the handle. In this arrangement, the piston-like thrust disc 6 is directly anchored to the forward end of the actuator rod 5 which is slidable within the handle and extends rearwardly therefrom beyond the rear end of the handle as in the first form of the device previously described. Stop means 15, preferably having the form of a ring or band, is suitably fixed on the actuator rod to engage the extreme rear end of the handle when the thrust disc is actuated to eject the newspaper from the holder 1', and thus limits the forward motion of the thrust disc beyond a position near the forward end of the holder, as shown in FIG. 8.

In FIG. 9, there is shown another modified form of my invention which is generally similar to the form illustrated in FIGS. 6 to 8, except that the holder 1" and its handle socket 12" are of open cage-like form, said handle socket being preferably formed as a integral extension of the holder but being of reduced size. As shown, the holder and the handle socket are composed of a plurality of longitudinally extended and relatively stiff wires, bars or rods 16 disposed in equidistantly spaced and parallel relation to each other about a common axis and which are rigidly connected together by a plurality of connector rings 17, 17' exteriorly encircling the same at appropriate intervals and welded or otherwise affixed thereto to hold the bars 16 in the form of generally tubular assembly in both the holder portion 1" and the handle socket portion 12" of the device. In this arrangement, the thrust disc 6 and its actuator rod 5, and stop means 15, as well as the handle 2 are identical to those of FIGS. 6 to 8 and are shown in broken lines.

In use, the modified devices are used and operated in the same manner as shown in FIGS. 1 and 5, as described in the foregoing, and therefore need not be further described. In all of the forms of the device of my invention, the parts thereof are preferably made of light-weight materials such as aluminum, or other light metals, plastic or fiber, or combinations thereof, to facilitate its fabrication, handling and use at a minimum of cost of manufacture and with a minimum of handling effort. The compact size of the device nevertheless extends the normal reach of the newspaper delivery person to a practical extent that is sufficient to quickly and easily permit delivery of the newspapers to roadside receivers or receptacles without leaving the vehicle when it is beyond normal arm length because of average snow banks or other obstructions which otherwise would make it necessary to leave the vehicle and hand-deposit the newspaper directly in the receiver or receptacle when the vehicle cannot approach the receiver close enough.

While the specific details of my invention have been shown and described herein, the invention is not confined thereto, and other changes or alternations can be made without departing from the spirit thereof as defined in the appended claims.

I claim:

1. A newspaper delivery aid for facilitating the delivery of newspapers by motor vehicle to individual customer delivery receivers located at roadside along a motor delivery route, comprising a longitudinally extended tubular holder, said holder being of such internal diameter and length as to be capable of receiving and supportingly embracing therein at least one end portion of a rolled or folded newspaper, a rigid elongated handle for supporting the holder, said handle being longitudinally extended rearwardly from the holder aforesaid and being of such length as to enable the holder to be maneuvered thereby into close proximity to the roadside newspaper receiver when the receiver is beyond the normal reach of a delivery person while occupying the delivery vehicle, but permitting the holder and handle to be freely and wholly withdrawn into and manipulated within the vehicle, and thrust means shiftably mounted within the holder and operable from the handle to eject the newspaper from the holder and into the roadside receiver when the holder is extended by the handle into close proximity to and alignment with the receiver, the distal end of the handle being anchored to the outer peripheral face of the holder by clamping means embracing the holder and the handle, said handle having a bore extended longitudinally therethrough and being provided with a laterally open slot in the wall thereof behind the holder, an elongated actuator member slidably mounted in the bore of the handle and longitudinally extended beyond the proximal end of the handle, and means interconnecting the actuator means through the slot aforesaid to the thrust means within the holder.

2. A device as defined in claim 1, wherein said interconnecting means comprises a connector rod of L-Shaped form, one arm of said connector rod being connected to the thrust means and extending rearward therefrom on the central axis of the holder, and the other arm of said connector rod being extended laterally through the slot in the handle and being fixed to the forward end of the slidable actuator means within the handle.

3. A device as defined in claim 1, wherein said interconnecting means comprises a connector rod of L-shaped form, one arm of said connector rod being connected to the thrust means and extending rearward therefrom on the central axis of the holder, and the other arm of said connector rod being extended laterally through the slot in the handle and being fixed to the forward end of the slidable actuator means within the handle, and the opposite ends of the slot constituting stop means for limiting forward and rearward movements of the thrust means within the holder when operated by the actuator means.

* * * * *